United States Patent
Hiller

(10) Patent No.: US 9,180,382 B2
(45) Date of Patent: Nov. 10, 2015

(54) INTERACTING BALLS TOY

(71) Applicant: Nathan D. Hiller, Irvine, CA (US)

(72) Inventor: Nathan D. Hiller, Irvine, CA (US)

( * ) Notice: Subject to any disclaimer, the term of this patent is extended or adjusted under 35 U.S.C. 154(b) by 80 days.

(21) Appl. No.: 14/123,222

(22) PCT Filed: Feb. 8, 2013

(86) PCT No.: PCT/US2013/025435
§ 371 (c)(1),
(2) Date: Dec. 1, 2013

(87) PCT Pub. No.: WO2013/120017
PCT Pub. Date: Aug. 15, 2013

(65) Prior Publication Data
US 2014/0134919 A1  May 15, 2014

Related U.S. Application Data

(60) Provisional application No. 61/597,750, filed on Feb. 11, 2012, provisional application No. 61/600,180, filed on Feb. 17, 2012.

(51) Int. Cl.
| | |
|---|---|
| *A63H 33/26* | (2006.01) |
| *A63F 7/04* | (2006.01) |
| *G09B 23/18* | (2006.01) |

(52) U.S. Cl.
CPC *A63H 33/26* (2013.01); *A63F 7/04* (2013.01); *G09B 23/18* (2013.01)

(58) Field of Classification Search
None
See application file for complete search history.

(56) References Cited

U.S. PATENT DOCUMENTS

| | | | | | |
|---|---|---|---|---|---|
| 2,258,329 | A | * | 10/1941 | MacDougall et al. | 273/118 A |
| 2,878,591 | A | * | 3/1959 | Harris | 434/291 |
| 3,158,955 | A | | 12/1964 | Sturgis | |
| 3,271,881 | A | * | 9/1966 | Wagnon | 434/300 |
| 3,778,927 | A | | 12/1973 | Edden | |
| 3,955,630 | A | | 5/1976 | Thomas | |
| 4,011,674 | A | * | 3/1977 | Jacobson | 40/426 |
| 4,099,340 | A | * | 7/1978 | Butler | 434/300 |
| 4,208,629 | A | * | 6/1980 | Friebel et al. | 324/457 |
| 5,026,314 | A | * | 6/1991 | Samson | 446/133 |
| 6,080,067 | A | | 6/2000 | Leff | |
| 6,603,457 | B1 | * | 8/2003 | Nakanishi | 345/107 |

OTHER PUBLICATIONS

Spangler Science: http://www.stevespanglerscience.com/products/electricity-energy/static-tube.html.
Nanoscale Informal Science Education Network http://www.nisenet.org/catalog/programs/exploring_forces_—_static_electricity_nanodays_2011.

* cited by examiner

*Primary Examiner* — Sunit Pandya

(57) ABSTRACT

One embodiment of a toy (22) having a plurality of balls (12) inside a container (26). Demonstrating ball interactions without the balls (12) making physical contact with one another can be accomplished with a flat, surface (20). To operate the toy (22) the user moves it and therefore its operation does not require the use of an auxiliary object with specific properties. Electrical charge migration in the toy (22) can cause the balls (12) to form patterns that can be used to play games. When the toy (22) is flipped upside down, the balls (12) can roll on the flat surface (18) located above them, which appear to the user as if the balls (22) are defying gravity. Other embodiments are described and shown.

17 Claims, 3 Drawing Sheets

INTERACTING BALLS TOY

CROSS-REFERENCE TO RELATED APPLICATIONS

This application claims the benefit of provisional patent applications Ser. No. 61/597,750, filed 2012 Feb. 11 and Ser. No. 61/600,180, filed 2012 Feb. 17 by the present inventor.

FEDERALLY SPONSORED RESEARCH

Not Applicable

SEQUENCE LISTING

Not Applicable

BACKGROUND

1. Field

This application relates to toys, specifically to toys that demonstrate interactions between balls.

2. Background Prior Art

It is common to see balls exchange kinetic energy, change their direction of motion, and oscillate as a result of physical contact occurring between them. A toy that demonstrates these ball interactions without the balls making physical contact with one another is amusing and educational.

Two organizations have demonstrated the movement of balls using, electric charges. Steve Spangler Science sells a toy made of a long plastic tube partially filled with polystyrene foam balls. If a user rubs their band on the outside of the tube, the balls become electrically charged and stick to the inner wall of the tube. Further touching of the tube can cause the balls to move because of the electric force that exists between the electric charge on the balls and the electric charge on the user's hand. The Nanoscale Informal Science Education Network provides instructions for the same demonstration but its balls are made of polyoxy-methylene and, instead of a bare hand, fleece is used to rub the tube which is DOW made of glass.

Although these toys demonstrate the movement of balls using electric charges. the observed ball interactions are limited for three reasons.

First, these toys have DO flat surface which results in obscured ball interactions for the user. A flat and level surface has minimal effect on a ball's kinetic energy and no effect on its direction of motion. In contrast, a curved surface obscures the interactions between balls because it adds another variable to these interactions. A curved surface can change a ball's kinetic energy and direction el motion. So a user observing ball interactions occurring on a curved surface will have difficulty distinguishing between changes in ball motions caused by other bails from those caused by the curved surface. Furthermore, a curved surface causes balls to bunch together at the lowest point of the curve which further obscures ball interactions due to limited or no space between them So because these toys do not have a flat surface, ball interactions are obscured for the user.

Second, excessive friction limits the user's observation time of ball interactions. After these toys are abruptly moved to set the ball's in motion, the ball's quickly come to a stop. This excessive friction is caused by a strong electric force between the balls and the tube wall if the user continuously moves the toy to keep the balls in motion then ball motion is obscured because a moving surface adds another variable to these ball interactions. A moving surface can change a ball's kinetic energy and direction of motion. So an observer watching ball interactions occurring on a moving surface will have difficulty distinguishing between changes in ball motions caused by other balls from those caused by the moving surface.

Third, the operation of these toys requires the use of an auxiliary object with specific properties. For the balls to become electrically charged, rubbing the outside surface of the tube is required. If the user's hand does the rubbing, its effectiveness depends on the amount of moisture or sweat on the hand since water conducts electricity and thereby reduces static. electricity. If another object is used to do the rubbing, only certain materials will work, such as fleece, which incurs additional cost to the user. Furthermore, charging the balls using any auxiliary object becomes less effective as the air humidity increases.

In conclusion, insofar as I am aware, no toy formerly developed demonstrates ball interactions without the balls making physical contact with one another, while the toy's operation does not require the use of an auxiliary object with specific properties.

SUMMARY

In accordance with one embodiment a toy comprises a plurality of balls inside a container.

DRAWINGS—FIGURES

DRAWINGS—REFERENCE NUMERALS

| | | | |
|---|---|---|---|
| 10 | unsealed toy | 12 | balls |
| 14 | top cover | 16 | bottom cover |
| 17 | curved surface | 18 | flat surface |
| 19 | curved surface | 20 | flat surface |
| 22 | toy | 24 | adhesive |
| 26 | container | 28 | normal line |
| 29 | direction parallel to die force of gravity | 31 | flat surface |
| 32 | balls | 33 | circular shape |
| 34 | black ball | 36 | white balls |
| 38 | red balls | 40 | green balls |
| 42 | circular shape | | |

DETAILED DESCRIPTION

Figure 1:
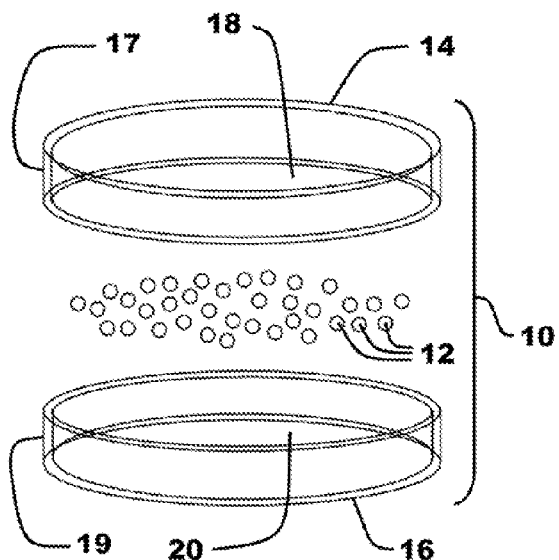
FIG. 1 is an exploded view of an unsealed toy in accordance with one embodiment.

FIG. 1 is an exploded view of a unsealed toy 10 in accordance with one embodiment. A plurality of balls 12 are surrounded and contained by a top cover 14 and a bottom cover 16. The top cover 14 has a curved surface 17 and a flat surface 18 connected to one end of the curved surface 17. The bottom cover 16 has a curved surface 19 and a flat surface 20 connected to one end of the curved surface 19. The flat surface 18 is parallel with the flat surface 20.

Figure 2:
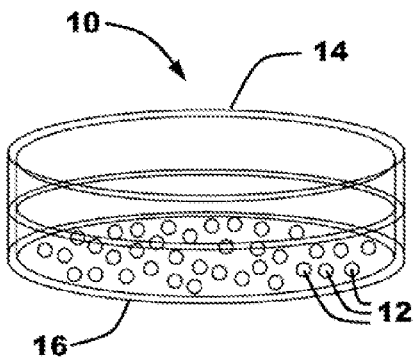
FIG. 2 is a perspective view of the unsealed toy of FIG. 1.

FIG. 2 is a perspective view of the unsealed toy 10 of FIG. 1. The balls 12 are solid, have a diameter of 2.5 mm with a tolerance of ±0.001 inches and a sphericity of 0.001 inches. The balls 12 are made of Delrin® which is a polymer called polyoxymethylene. There are seventy five of the balls 12 in the unsealed toy 10. The top cover 14 and the bottom cover 16 each have a 2.25 inch outer diameter and a 0.40 inch height so that the unsealed toy 10 total height is 0.80 inches. The top cover 14 and the bottom cover 16 are made of a transparent polymer called polystyrene and have a wall thickness of 0.039 inches.

Figure 3:
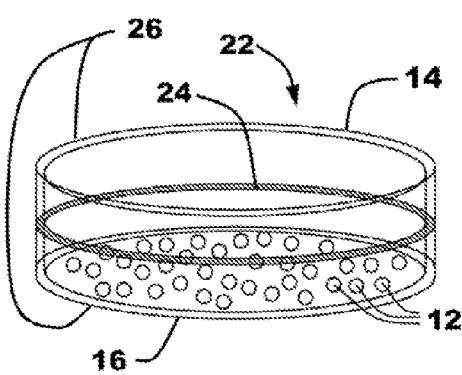
FIG. 3 is a perspective view of a toy sealed with an adhesive.

FIG. 3 is a perspective view of a toy 22 that was sealed using an adhesive 24 to join the top cover 14 to the bottom cover 16. Joining the top cover 14 to the bottom cover 16 forms a container 26 that is hollow and has a cylindrical shape, Thus the adhesive 24 is a means for sealing the container 26. The top cover 14, the bottom cover 16 and the adhesive 24 constitute a means for containing the hails 12.

Figure 4:
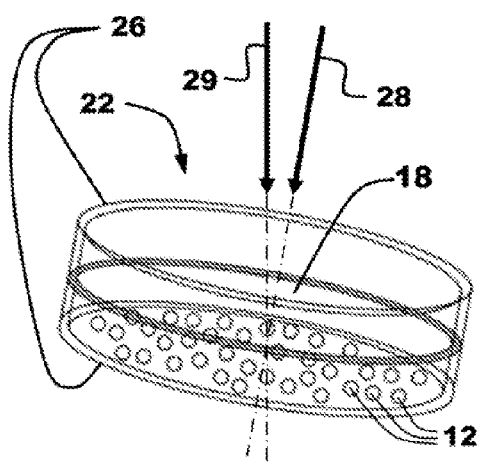
FIG. 4 is a perspective view of the toy of FIG. 3 that is moved by being tilted, flipped, shaken, or spun.

FIG. 4 is a perspective view of the toy 22 that is moved by being tilted, flipped, shaken, or spun. A direction parallel to the force of gravity 29 is shown to indicate the orientation of gravity. A normal line 28 is shown to indicate the orientation of the toy 22. There is a ninety degree angle between the normal line 28 and the fiat surfaces 18 and 20. Tilting the toy 22 is accomplished if the normal line 28 and the direction parallel to the force of gravity 29 are not parallel. Tilting the toy 22 is a means of moving the toy 22. Flipping the toy 22 is accomplished by rotating the toy 22 such that before the flip the arrow of the normal line 28 and the arrow of the direction parallel to the force of gravity 29 are pointing in the same direction and after the flip the normal line 28 and the arrow of the direction parallel to the force of gravity 29 are pointing in opposite directions. Flipping the toy 22 is a means of moving the toy 22. Shaking the toy 22 is accomplished by repeatedly accelerating and decelerating the toy 22. Shaking the toy 22 is a means of moving the toy 22. Spinning the toy 22 is accomplished by rotating the toy 22 about the normal line 28. Spinning the toy 22 is a means of MOV rig the toy 22. Moving the toy 22 is equivalent to moving the container 26.

Figure 5:
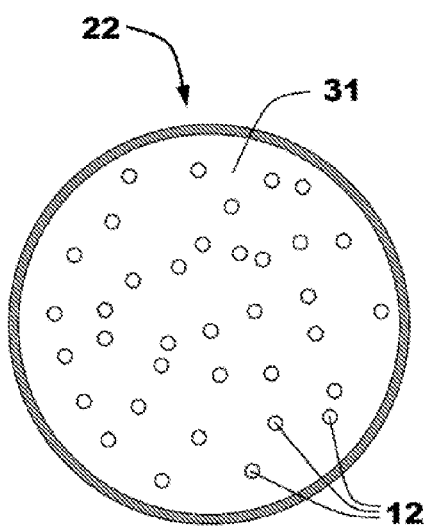
FIG. 5 is a top view of the toy of FIG. 3.

FIG. 5 is a top view of the toy 22 of FIG. 3. The balls 12 are supported by a flat surface 31. From the top view of the toy 22 the flat surface 31 is the flat surface 20 of FIG. 1. From the bottom view of the toy 22 the flat surface 31 is the flat surface 18 of FIG. 1.

Figure 6:
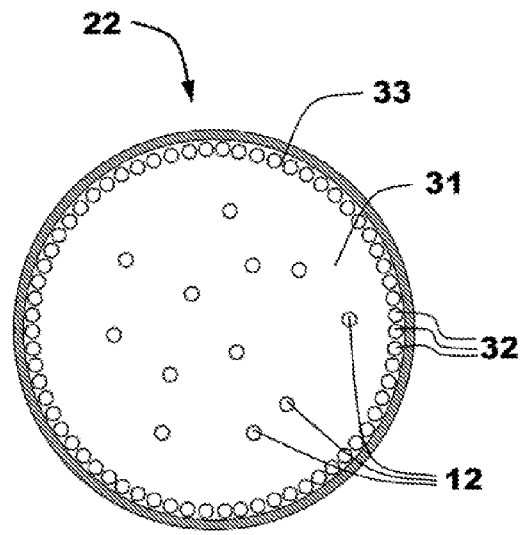
FIG. 6 is a top view of the by of FIG. 3 where a plurality of balls have become distributed into a circular shape and the remaining balls dynamically interact within the circular shape.

FIG. 6 is a top view of the toy 22 of FIG. 3 where a plurality of balls 32 have become distributed into the form of a circular shape 33 and the balls 12 interact within the circular shape 33. The balls 32 and the balls 12 are supported by a flat surface 31. From the top view of the toy 22 the flat surface 31 is the flat surface 20 of FIG. 1. From the bottom view of the toy 22 the flat surface 31 is the flat surface 18 of FIG. 1. The circular shape 33 with the balls 12 inside the circular shape 33 constitutes a ball pattern.

Figure 7:
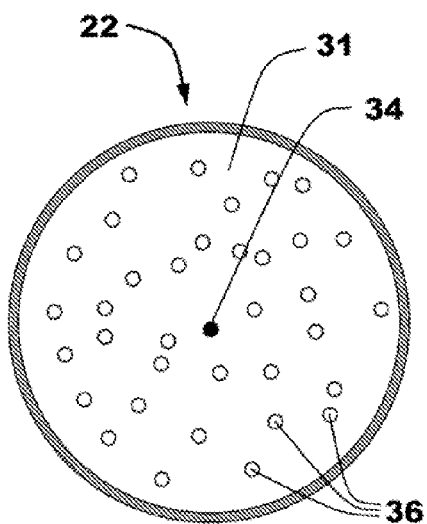
FIG. 7 is a top view of the toy of FIG. 3 where a black ball is surrounded by a plurality of white balls.

FIG. 7 is a top view of the toy 22 of FIG. 3 where the balls 12 have different colors. One of the balls 12 is black as indicated by a black ball 34. The balls 12 that remain are white as indicated by a plurality of white balls 36. The black ball 34 and the white balls 36 are supported by a flat surface 31. From the top view of the toy 22 the flat surface 31 is the flat surface 20 of FIG. 1. From the bottom view of the toy 22 the flat surface 31 is the flat surface 18 of FIG. 1.

Figure 8:
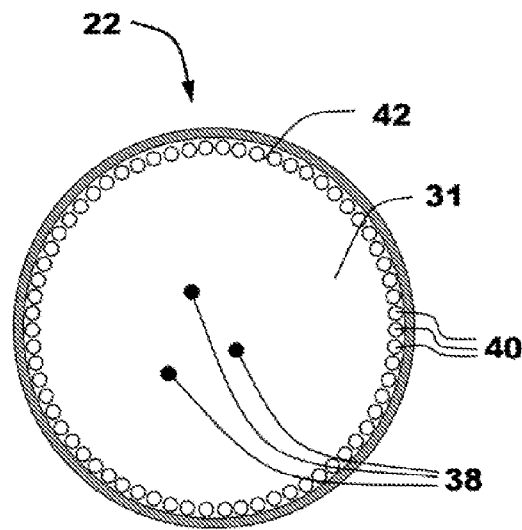
FIG. 8 is a top view of the toy of FIG. 3 where a plurality of green balls have become distributed into a circular shape and a plurality of red balls dynamically interact within the circular shape.

FIG. 8 is a top view of the toy 22 of FIG. 3 where the balls 12 have different colors and their total number has been reduced to sixty eight. Some of the balls 12 are red as indicated by a plurality of red balls 38. The balls 12 that remain are green as indicated by a plurality of green balls 40. The green balls 40 have become distributed into the form of a circular shape 42 and the red balls 38 interact within the circular shape 42. The red balls 38 and the green balls 40 are supported by a flat surface 31. From the top view of the toy 22 the flat surface 31 is the flat surface 20 of FIG. 1. From the bottom view of the toy 22 the flat surface 31 is the flat surface 18 of FIG. 1. The circular shape 42 with the balls 38 inside the circular shape 42 constitutes a ball pattern.

Figure 9:
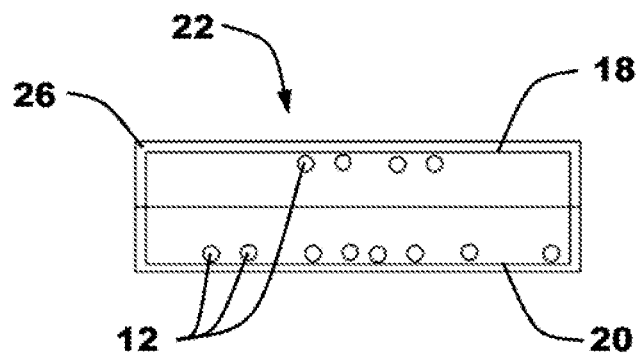
FIG. 9 is a side view of the toy of FIG. 3 that has been flipped upside down resulting in a plurality of balls rolling on a flat surface above them.

FIG. 9 is a side view of the toy 22 of FIG. 3. When the toy 22 is flipped upside down, the balls 12 can roll on the flat surface 18 located above the balls 12.

Operation

To operate the toy 22 the user moves the to 22 followed by observing the balls 12. Moving the toy 22 can be accomplished by, although is not limited to, shaking, tilting, flipping, or spinning the toy 22 (FIG. 4). Moving the container 26 is equivalent to moving the toy 22. Moving the to 22 with a sufficient force causes the balls 12 to become electrically charged as they exchange electrical charge with the container 26 (FIG. 3) during contact events. Contact events between the balls 12 and the container 26 (FIG. 3) can occur by, although is not limited to, collisions with, sliding, or rolling across the flat surface 31 (FIG. 5) or the curved surfaces 17 and 19 (FIG. 1) of the toy 22. From the top view of the to 22 the flat surface 31 (FIG. 5) is the flat surface 20 of FIG. 1. From the bottom view of the toy 22 the flat surface 31 (FIG. 5) is the flat surface 18 of FIG. 1. While I believe this transfer of electrical charge between the balls 12 and the container 26 (FIG. 3) occurs because of triboelectrification, I don't wish to be bound by this. Thus moving the to 22 is a means for charging the hails 12.

Once the balls 12 become electrically charged, the user can move the toy 22 and then observe the balls 12 interacting with one another without physical contact occurring between them. Operating the toy 22 does not require the use of an auxiliary object with specific properties.

Electrical charge migration in the container 26 (FIG. 3) can result in the formation of the ball patterns shown in FIG. 6 and FIG. 8, in the ball pattern of FIG. 6, the bails 32 have become distributed into the form of the circular shape 33 and the balls 12 interact within the circular shape 33, in the ball pattern of FIG. 8, the green balls 40 have become distributed, into the form of the circular shape 42 and the red balls 38 interact within the circular shape 42.

The toy 22 can be a game if the user attempts to maneuver the black ball 34 into the center of the toy 22 as shown in FIG. 7 or the red balls 38 into the center of the toy 22 as shown in FIG. 8. The black ball 34 can be maneuvered by tilting the toy 22. Thus tilting the toy 22 is a means for maneuvering the black ball 34 or the red balls 38.

After the balls 12 become electrically charged, the toy 22 can be flipped upside down to demonstrate that the balls 12 can roll on the flat surface 18 located above the balls 12, which appear to the user as if the balls 22 are defying gravity.

Advantages

From the description above, a number of advantages of some embodiments of my interacting balls toy become evident:

(a) The presence of a flat surface result in ball interactions that are more clearly observable by the user, and such interactions occur without the balls making physical contact with one another.

(b) The user's observation time of ball interactions is not limited by excessive friction.

(c) To operate the toy, the user simply moves it and therefore its operation does not require the use of an auxiliary object with specific properties.

(d) Electrical charge migration in the toy can cause the balls to form a ball pattern that can be used to play a challenging game.

(e) When the toy is flipped upside down, some of the balls roll on the flat surface located above them, which appear to the user as if the balls are defying gravity.

Conclusions, Ramifications, and Scope

Accordingly, the reader will see that the interacting balls toy of the various embodiments can be used to demonstrate ball interactions without: the balls making physical contact with one another, while the toy's operation does not require the use of an auxiliary object with specific properties. In addition, electrical charge migration in the toy can cause the balls to form a ball pattern that can be used to play a challenging game. Furthermore, when the toy is flipped upside down, some of the balls roll on the flat surface located above them, which appear to the user as if the balls are defying gravity.

Although the description above contains many specificities, these should not be construed as limiting the scope of the embodiments but as merely providing illustrations of some of the presently preferred embodiments. For a first example, the container and balls can be made of different colors, sizes, materials, quantities, and shapes, such as the previously presented Darin® balls inside a 1.5 inch by 1.5 inch by 1.5 inch cube shaped polystyrene container, or a quantity of eighty glow-in-the-dark 2.0 mm diameter cellulose acetate balls inside a 1.5 inch by 1.5 inch by 1.5 inch cube shaped polyethylene terephthalate container. For a second example, the adhesive used to join the top cover to the bottom cover can be eliminated if these covers are melted, together or they have a means of mechanically attaching to one another such as a mechanical clipping, screwing, or press fitting mechanism, etc. In a third example, the sizes of the upper and bottom covers can be unequal or one of them can be eliminated, such as a cover shaped like a nearly closed hollow cylinder with an opening only slightly larger than the balls so that they can be placed inside the cover followed by closing this opening using various means, such as a cap, plug, cover, drop of adhesive, etc. In a fourth example, information or designs can be printed on or adhered to the container to aid in game playing or for various product or service advertising. In a final example, an area of the container can be made reflective in order to provide images of objects inside or outside of the container, such as multiple images of the balls.

Thus the scope of the embodiments should be determined by the appended claims and their legal equivalents, rather than by the examples given.

I claim:

1. An article, comprising:
   (a) an enclosed hand-held container, wherein at least one portion of surface of said container is transparent;
   (b) a plurality of balls contained within said container and visible through the transparent surface; and
   (c) whereby a human can move said hand-held container to:
      1. transfer electrical charge between said balls and said container so that said balls and said container become electrically charged; and
      2. maneuver and observe, through the transparent surface, said balls as they interact with one another without physical contact occurring between them.

2. The article of claim 1 wherein said container includes a flat surface.

3. The article of claim 1 wherein said container includes a reflective surface.

4. The article of claim 1 wherein said container includes a curved surface.

5. An article, comprising:
   (a) an enclosed hand-held container, wherein at least one portion of surface of said container is transparent;
   (b) a plurality of balls contained within said container and visible through the transparent surface; and
   (c) whereby a human can move said hand-held container to:
      1. transfer electrical charge between said balls and said container so that said balls and said container become electrically charged; and
      2. maneuver and observe, through the transparent surface said balls located within shape of the container, as they interact with one another without physical contact occurring between them, wherein the electrical charge repeals the balls away from each other to the outside edge of said container, and remaining balls not pushed to the outside edge, appears to hover in center of said container.

6. The article of claim 5 wherein said container includes a flat surface.

7. The article of claim 6 wherein said flat surface is level.

8. The article of claim 6 wherein a normal line projected from said flat surface is parallel to the force of gravity.

9. The article of claim 5 wherein said container includes a reflective surface.

10. The article of claim 5 wherein said container includes a curved surface.

11. The article of claim 2 wherein said flat surface is level.

12. The article of claim 2 wherein a normal line projected from said flat surface is parallel to the force of gravity.

13. An article, comprising:
   (a) an enclosed hand-held container, with plurality of surfaces and at least one of said surfaces is located above said balls, wherein at least one portion of the surface of said container is transparent;
   (b) a plurality of balls contained within said container and visible through the transparent surface; and
   (c) whereby a human can move said hand-held container to:
      1. transfer electrical charge between said balls and said container so that said balls and said container become electrically charged; and
      2. maneuver and observe said balls, through the transparent surface, as they stick to and/or roll on said surface located above said balls, which appears that said balls are defying gravity.

14. The article of claim 13 wherein said container includes a flat surface.

15. The article of claim 14 wherein said flat surface is level.

16. The article of claim 14 wherein a normal line projected from said flat surface is parallel to the force of gravity.

17. The article of claim 13 wherein said container includes a curved surface.

* * * * *